United States Patent [19]

Mamoto et al.

[11] Patent Number: 5,188,851

[45] Date of Patent: Feb. 23, 1993

[54] FEED COMPOSITION FOR FISH BREEDING INCLUDING MONONUCLEOTIDES

[75] Inventors: Katsuhiro Mamoto, Matsudo; Yasuyuki Nakamura; Akiyoshi Kawaoka, both of Iwakuni; Masahiko Tabata, Otake, all of Japan

[73] Assignee: Sanyo-Kokusaku Pulp Co., Ltd., Tokyo, Japan

[21] Appl. No.: 616,074

[22] Filed: Nov. 20, 1990

[30] Foreign Application Priority Data

Nov. 21, 1989 [JP]  Japan .................................. 1-300841

[51] Int. Cl.$^5$ .......................... A01K 61/00; A23L 2/26; A23L 1/325; C07H 19/00
[52] U.S. Cl. .......................................... 426/2; 426/537; 426/643; 536/26.7; 536/26.74; 536/26.8
[58] Field of Search .............................. 536/27, 28, 29

[56] References Cited

U.S. PATENT DOCUMENTS 4,102,806  7/1978  Kondo et al. ..................... 252/316

FOREIGN PATENT DOCUMENTS 0302807  2/1989  European Pat. Off. .

OTHER PUBLICATIONS

Kieffer et al., *Fresenius' Z. Anal. Chem.*, 221: 416–424 (1966).
Kusuwi et al., *Chem. Abstr.*, 94: 82285z (1981).
Herbel et al., *Chem. Abstr.*, 105: 132240z (1986).
Vogt, *Chem. Abstr.*, 79: 4162h (1973).
Chiou et al., *Chem. Abstr.*, 110: 191445w (1989).
Zoellner, *Chem. Abstr.*, 90: 167055s (1979).

*Primary Examiner*—Johnnie R. Brown
*Assistant Examiner*—L. Eric Crane
*Attorney, Agent, or Firm*—Oblon, Spivak, McClelland, Maier & Neustadt

[57]  ABSTRACT

A feed composition for fish breeding with an improved preference for fish comprises from 0.03 to 1% by weight of each of 5'-guanylic acid, 5'-cytidylic acid, 5'-uridylic acid and 5'-adenylic acid or 5'-inosinic acid, all of which are hydrolyzates of ribonucleic acid, or a yeast extract containing a large amount of the foregoing 5'-nucleotides and oligopeptide.

8 Claims, No Drawings

FEED COMPOSITION FOR FISH BREEDING INCLUDING MONONUCLEOTIDES

FIELD OF THE INVENTION

The present invention relates to a mixed feed for fish breeding to change for better the preference of fish, for food which comprises 0.03 to 1% by weight of each of 5'-guanylic acid (hereinafter "GMP"), 5'-cytidylic acid (hereinafter "CMP"), 5'-uridylic acid (hereinafter "UMP"), and 5'-adenylic acid (hereinafter "AMP") or 5'-inosinic acid (hereinafter "IMP"), all of which are hydrolyzates of ribonucleic acid, or a yeast extract containing large amounts of the foregoing 5'-nucleotides and oligopeptide.

BACKGROUND OF THE INVENTION

In recent years, the proportion of breeded fish which accounts in the catch is being increased, and importance of the fish breeding tends to increase in future.

At present, in the case of fresh-water fish, feeds used are for the most part, mixed feeds. On the other hand, in the case of sea-water fish, living baits are mainly used, and the sea-water fish are breeded with moist pellets comprising a mixture of a mixed feed and a living bait. However, even in the case of the sea-water fish, when living baits are used, there have recently been caused problems in the contamination of sea-water, quality stability, and workability of bait feeding. Accordingly, complete mixed feeds which are free from these problems partly started to be used.

However, since the mixed feeds involve such defects that the cost is high and the taste is bad as compared with those of living baits, the fact is that they are hard to wide spread except for fry. At present, in order to improve the preference for food of fish, fish internal organ extracts, krills, etc. are used, since there are problems in the quality and the feeding stability, and satisfactory effects have not yet been obtained.

SUMMARY OF THE INVENTION

The present inventors have made extensive investigations. As a result, it has been found that while a single use of a 5'-nucleotide is insufficient in improving the preference, the preference is greatly improved by a synergistic effect if a mixture of four kinds of nucleotides comprising a combination of AMP, GMP, UMP and CMP or of IMP, GMP, UMP and CMP, or (from) 0.1 to 20% by weight of a yeast extract containing (from) 0.5 to 10% by weight of each of GMP, UMP, CMP and AMP or IMP, or (from) 0.1 to 20% by weight of a yeast extract containing (from) 10 to 45% by weight of oligopeptide in addition to the above-described nucleotides is incorporated in a mixed feed. Furthermore, the present inventors have found a peculiar effect to be brought in a method in which four kinds of nucleotides of AMP, GMP, UMP and CMP, or of IMP, GMP, UMP and CMP, all of which are hydrolyzates of ribonucleic acid, are each added in an amount of from 0.03 to 1% to a usual mixed feed formulation.

Since these nucleotide components can readily be obtained by hydrolyzing ribonucleics acid which is at present industrially produced from a yeast and, if desired, further deaminating the hydrolyzate, the present invention is quite meaningful from the standpoint of practical use.

DETAILED DESCRIPTION OF THE INVENTION

In order to obtain a mixture of AMP, GMP, UMP and CMP, a method for hydrolyzing ribonucleic acid which has been obtained from a yeast with 5'-phosphodiesterases into 5'-nucleotides is advantageous. Further, in order to obtain a mixture of IMP, GMP, UMP and CMP, the above-described mixture may be exerted with deaminases.

In the case of making use of the yeast extract containing large amounts of 5'-nucleotides and oligopeptide, it can be obtained by the method disclosed in Japanese Patent Laid-Open No. 201595/1987 (Japanese Patent Application No. 15583/1986). That is, a method in which a yeast cell suspension is heated to 80° to 100° C. to deactivate proteases and ribonucleases present in the cell and then exerted with cell membrane lysins, 5'-phosphodiesterases, 5'-adenylic acid deaminases, and proteases are advantageous. Further, the yeast which can be a raw material of the yeast extract in the present invention is not limited to yeasts belonging to the Saccharomyces represented by beer yeast or baker's yeast but includes those belonging to the Candida or the Pichia, etc.

Hitherto, yeast extracts have been produced by the autolysis method, but in this method, the formation of 5'-nucleotides and oligopeptide is hardly found. Due to the fact, in the conventional yeast extracts, an improvement in the preference has been less improved.

As to the type of fish to which the present invention has been made available, both fresh-water fish such as eel and sea-water fish such as yellowtail, all of which are usually breeded, are useful. In particular, for fry these formations are effective because preference is improved, amount of a bait taken is increased, death from disease is reduced, and growth is promoted.

As the raw material of the mixed feed to be used in the present invention, usual raw materials for mixed feeds such as fish meal, wheat, wheat gluten, soybean cakes, etc. can be used. Usually, if the proportion of fish meal is decreased, the preference drops, and the amount of a bait taken is reduced. However, the nucleotides and yeast extract according to the present invention are also effective in such cases.

The content of each of the 5'-nucleotides in the present invention is effective in an amount of 0.03% or more, but if the amount exceeds 2%, the effect is saturated. Further, the content of the yeast extract is effective in an amount of 0.1% or more, but if the amount exceeds 20%, the effect is saturated.

The addition of the 5'-nucleotides or yeast extract can be carried out in any arbitrary stage until a product has been obtained. For example, in the case of powdered mixed feeds, necessary amounts thereof may be added during the stage of mixing the powders. Further, in the case of dry pellets, necessary amounts thereof are added during the mixing of the powders, a suitable amount of water is added thereto, and after kneading in a kneader, etc., the mixture is shaped by means of an extruder under heating and pressure, etc., followed by calcination. Still further, a method for coating or smearing necessary amounts thereof on the surface are also effective. In this manner, feed for fish breeding to improve the preference fish can be obtained.

EXAMPLE 1

To a basic feed shown in Table 1, a 5'-nucleotide(s) was added in an amount shown in Table 2. The mixture was then kneaded with water in a ratio of water to the feed of 1.2/1, to prepare a test feed.

TABLE 1

| | |
|---|---|
| Fish meal | 75 |
| α-Starch | 18 |
| Wheat gluten | 2 |
| Salt | 1 |
| Calcium phosphate | 1 |
| Bile powder | 1 |
| Beer yeast | 2 |

TABLE 2

| | [Content of nucleotide and feed name] | | | | | | | |
|---|---|---|---|---|---|---|---|---|
| Nucleotide | a | b | c | d | e | f | g | h |
| IMP | 0 | 0.1 | 0 | 0 | 0 | 0 | 0.025 | 0 |
| AMP | 0 | 0 | 0.1 | 0 | 0 | 0 | 0 | 0.025 |
| GMP | 0 | 0 | 0 | 0.1 | 0 | 0 | 0.025 | 0.025 |
| CMP | 0 | 0 | 0 | 0 | 0.1 | 0 | 0.025 | 0.025 |
| UMP | 0 | 0 | 0 | 0 | 0 | 0.1 | 0.025 | 0.025 |
| Total | 0 | 0.1 | 0.1 | 0.1 | 0.1 | 0.1 | 0.1 | 0.1 |

500 g of fry of European eel were released and breeded for experimentation in a water tank having a size of 2×1×0.8 m (water depth: 0.6 m) while pouring well water at 24.8° C.

In the experimentation, a transparent plastic hollow cylinder was placed in a plastic network cage, the test feed was charged therein, and the number of eels crowded around the feed was observed thereby to determine an improving effect of the preference, make ranking, and then make evaluation based on an average rank. Each of the experiments was carried out ten times per day by combining four kinds of feeds, i.e., Feed a as a control, Feed g, Feed h, and one of Feeds b to f.

TABLE 3

| | [Experimental results of improving preference to eel (synergistic effect)] | | | | | | | |
|---|---|---|---|---|---|---|---|---|
| Experiment No. | Feed Name | | | | | | | |
| | a | b | c | d | e | f | g | h |
| 1 | 3.6 | 3.4 | | | | | 1.6 | 1.4 |
| 2 | 3.6 | | 3.4 | | | | 1.4 | 1.6 |
| 3 | 3.6 | | | 3.4 | | | 1.6 | 1.4 |
| 4 | 3.4 | | | | 3.4 | | 1.4 | 1.6 |
| 5 | 3.6 | | | | | 3.4 | 1.4 | 1.6 |

It can be understood from the foregoing results that the mixtures of four kinds of nucleotides greatly improve the preference by the synergistic effect as compared with the case of the use of a nucleotide alone.

EXAMPLE 2

The influence of the content of nucleotides on the preference of eels was examined in the same manner as in Example 1 with respect to the nucleotide formulation shown in Table 4.

TABLE 4

| | [Content of nucleotide and feed name] | | | | | | |
|---|---|---|---|---|---|---|---|
| Nucleotide | Feed Name | | | | | | |
| | a | g | h | i | j | k | l |
| IMP | 0 | 0.025 | 0 | 0.1 | 0 | 1 | 0 |
| AMP | 0 | 0 | 0.025 | 0 | 0.1 | 0 | 1 |
| GMP | 0 | 0.025 | 0.025 | 0.1 | 0.1 | 1 | 1 |
| CMP | 0 | 0.025 | 0.025 | 0.1 | 0.1 | 1 | 1 |
| UMP | 0 | 0.025 | 0.025 | 0.1 | 0.1 | 1 | 1 |
| Total | 0 | 0.1 | 0.1 | 0.4 | 0.4 | 4 | 4 |

TABLE 5

| | [Content of nucleotide nad feed name] | | | | | |
|---|---|---|---|---|---|---|
| Experiment No. | Feed Name | | | | | |
| | a | g | h | i | j | k | l |
| 6 | 4 | 3 | | 1.6 | | 1.4 | |
| 7 | 4 | | 3 | | 1.6 | | 1.4 |

It is clear from the foregoing results that the improving effect on the preference is saturated at a content of 1%.

EXAMPLE 3

The improving effect on the preference to yellowtails was examined by using the same feed formulations as in Example 1.

The experimentation was carried out by using 4 to 8 yellowtails fry in a 100 liter-volume water tank and feeding the fry with a bait until saturation, i.e., until they refused the baits. The bait feeding was rapidly carried out once a day for about 15 minutes. Five plots of water tanks were provided, and experimentation was carried out repeatedly in a manner set forth below. The amount of bait taken was measured, and the evaluation was made in terms of a ratio in the effect for taking a bait (test plot/control plot a).

| [Bait feeding patterns] | |
|---|---|
| First plot | a (control) → g → b → h |
| Second plot | a (control) → g → c → h |
| Third plot | a (control) → g → d → h |
| Fourth plot | a (control) → g → e → h |
| Fifth plot | a (control) → g → f → h |

In each of the plots, the bait feeding was continuously carried out for 12 days.

TABLE 6

| | [Experimental results of improving preference to yellowtail] | | | | | | | |
|---|---|---|---|---|---|---|---|---|
| Experiment No. | Feed Name | | | | | | | |
| | a | b | c | d | e | f | g | h |
| 8 (1st plot) | 1.00 | 1.01 | | | | | 1.11 | 1.10 |
| 9 (2nd plot) | 1.00 | | 0.98 | | | | 1.12 | 1.11 |
| 10 (3rd plot) | 1.00 | | | 0.97 | | | 1.10 | 1.13 |
| 11 (4th plot) | 1.00 | | | | 1.00 | | 1.12 | 1.11 |
| 12 (5th plot) | 1.00 | | | | | 1.01 | 1.11 | 1.13 |

It can be understood from the foregoing results that the mixture of four kinds of nucleotides greatly improve the effect on yellowtails as compared with the case of the use of a nucleotide alone.

EXAMPLE 4

The influence of the content of nucleotides on the preference of yellowtails was examined in the same manner as in Example 3 by using the same feed formulations as in Example 2. The bait feeding was carried out thrice in accordance with the following patterns.

(1) a→g→a→i→a→k (2) a→h→a→j→a→l

TABLE 7

[Experimental results of improving preference to yellowtail]

| Experiment No. | Feed Name | | | | | | |
|---|---|---|---|---|---|---|---|
| | a | g | h | i | j | k | l |
| 12 | 1.0 | 1.11 | | 1.18 | | 1.20 | |
| 13 | 1.0 | | 1.12 | | 1.19 | | 1.20 |

It is understood from the foregoing results that the improving effect on the preference is saturated at a content of 1%.

EXAMPLE 5

To a basic feed shown in Table 8, a yeast extract having the formulation shown in Table 9 was added such that its content was 1%. The mixture was then kneaded with water in a ratio of water to the feed of 1.2/1, to prepare a test feed. The feed names are each expressed in a small alphabet letter of the yeast extract to be added.

TABLE 8

| | |
|---|---|
| Fish meal | 75 |
| α-Starch | 18 |
| Wheat gluten | 1 |
| Salt | 1 |
| Calcium phosphate | 1 |
| Bile powder | 1 |
| Beer yeast | 2 |

TABLE 9

[Formulation of yeast extract]

| | Yeast Extract Name | | | | | | | |
|---|---|---|---|---|---|---|---|---|
| | M* | N | O | P | Q | R | S | T | U |
| Oligopeptide | 5 | 5 | 6 | 5 | 5 | 6 | 10 | 25 | 32 |
| Free amino acid | 32 | 32 | 32 | 32 | 32 | 32 | 28 | 8 | 8 |
| 5'-Nucleotide | | | | | | | | | |
| 5'-I | 0.1 | 0.5 | 4 | 10 | | | 0.1 | 0.1 | 9 |
| 5'-A | | | | | 0.5 | 5 | | | |
| 5'-G | 0.2 | 0.6 | 3 | 9 | 0.6 | 4 | 0.2 | 0.2 | 9 |
| 5'-C | 0.1 | 0.6 | 3 | 9 | 0.7 | 5 | 0.1 | 0.2 | 10 |
| 5'-U | 0.2 | 0.6 | 3 | 10 | 0.7 | 5 | 0.2 | 0.1 | 11 |
| Total | 0.6 | 2.3 | 13 | 38 | 2.5 | 19 | 0.6 | 0.6 | 39 |

*M: conventional yeast extract

In the same manner as in Example 1, 500 g of fry of European eels were released and breeded for experimentation in a water tank having a size of 2×1×0.8 m (water depth: 0.6 m) while pouring well water at 24.8° C.

In the experimentation, a transparent plastic hollow cylinder was placed in a plastic network cage, the test feed was charged therein, and the number of eel crowded around the feed was observed thereby to determine an improving effect of the preference, rank, and then evaluate based on an average rank. Each of the experiments was carried out ten times per day by combining four or five kinds of feeds selected from Feeds m to u with Feed a as a control.

The experimental results of the improving effect on the preference against eels are shown in Table 10.

TABLE 10

[Formulation of yeast extract]

| Experiment No. | Yeast Extract Name | | | | | | | | |
|---|---|---|---|---|---|---|---|---|---|
| | a* | m | n | o | p | q | r | s | t | u |
| 14 | 4.6 | 4.4 | 3.0 | 1.6 | 1.4 | | | | | |
| 15 | 3.6 | 3.4 | | | | 1.6 | 1.4 | | | |
| 16 | 3.6 | 3.4 | | | | | | 1.6 | 1.4 | |
| 17 | 4.6 | 4.4 | | | 2.2 | | 2.0 | | | 1.8 |

*only basic feed

It can be understood from the foregoing results that the improving effect on the preference is saturated at a content of each 5'-nucleotide of about 10% in Experiments 14 and 15 and at a content of oligopeptide of about 30% in Experiments 16 and 17, respectively.

Next, with respect to Feed n, the influence of the addition rate of the yeast extract to the basic feed was examined (Experiment 18). The results obtained are shown in Table 11.

TABLE 11

[Influence of addition rate of yeast extract]

| Addition Rate (%) | 0 | 0.1 | 1 | 5 | 20 |
|---|---|---|---|---|---|
| Average Rank | 5 | 4 | 2.4 | 1.8 | 1.8 |

EXAMPLE 6

The improving effect on the preference against yellowtails was examined by using the same feed formulations as in Example 5.

The experimentation was carried out by using 4 to 8 yellowtail fry in a 100 liter-volume water tank and feeding the fry with a bait until the saturattion, i.e., until they refused the baits. The bait feeding was rapidly carried out once a day for about 15 minutes. Four plots of water tank were provided, and the experimentation was carried out repeatedly in a pattern set forth below. The amount of baits taken was measured, and the evaluation was made in terms of a ratio in the effect in taking a bait (test plot/control plot a). The bait feeding was carried out at the same time in the four plots.

| | |
|---|---|
| First plot | a → m → n → o → p |
| Second plot | a → m → q → r |
| Third plot | a → m → s → t |
| Fourth plot | a → m → p → r → u |

The bait feeding in each of the plots was carried out continuously in three cycles.

The experimental results yellowtails are shown in Table 12.

TABLE 12

[Experimental results of improvement in the preference of various yeast extracts against yellowtails (numerical values: ratio of the effect in taking a bait)]

| Experiment No. | Feed Name | | | | | | | | |
|---|---|---|---|---|---|---|---|---|---|
| | m | n | o | p | q | r | s | t | u |
| 6 (1st plot) | 1.01 | 1.07 | 1.15 | 1.14 | | | | | |
| 7 (2nd plot) | 1.02 | | | | 1.08 | 1.14 | | | |
| 8 (3rd plot) | 0.98 | | | | | | 1.05 | 1.09 | |
| 9 (4th plot) | 0.99 | | | 1.13 | | 1.12 | | | 1.14 |

Next, with respect to Feed n, the influence of the addition rate of the yeast extract to the basic feed was examined (Experiment 23). The results obtained are shown in Table 13.

The bait feeding was carried out thrice in the same pattern as in Example 2 in accordance with the following pattern.

0% (control)→0.1%→0%→0%→5%→0%→10%

TABLE 13

| [Influence of addition rate of yeast extract] | | | | | |
|---|---|---|---|---|---|
| Addition Rate (%) | 0 | 0.1 | 1 | 5 | 20 |
| Ratio of effect in taking bait | 1.00 | 1.06 | 1.09 | 1.16 | 1.15 |

It is clear from the foregoing results that the effect is saturated at an addition rate of about 5%.

From the above Example, if a feed for fish breeding is incorporated with GMP, CMP, UMP, and AMP or IMP, or a yeast extract containing large amount of the foregoing nucleotides and oligopeptide, preference of fish can be greatly improved.

While the invention has been described in detail and with reference to specific embodiments thereof, it will be apparent to one skilled in the art that various changes and modifications can be made therein without departing from the spirit and scope thereof.

What is claimed is:

1. In a feed composition for fish breeding containing fish meal, the improvement wherein said feed composition contains an amount of 5'-guanylic acid, 5'-cytidylic acid, 5'-uridylic acid, and 5'-adenylic acid or 5'-inosinic acid effective to synergistically improve the feeding preference of fish for said feed composition, wherein said feed composition comprises
    (a) 0.03-1 wt. % of each of 5'-guanylic acid, 5'-cytidylic acid, 5'-uridylic acid, and 5'-adenylic acid or 5'-inosinic acid,
    (b) 0.1-20 wt. % of an extract from yeast containing 0.5-10 wt. % of each of 5'-guanylic acid, 5'-cytidylic acid, 5'-uridylic acid, and 5'-adenylic acid or 5'-inosinic acid, or
    (c) 0.1-20 wt. % of an extract from yeast containing 0.5-10 wt. % of each of 5'-guanylic acid, 5'-cytidylic acid, and 5'-adenylic acid or 5'-inosinic acid and 10-45 wt. % of an oligopeptide.

2. The feed composition of claim 1, comprising 0.03-1 wt. % of each of 5'-guanylic acid, 5'-cytidylic acid, 5'-uridylic acid, and 5'-adenylic acid or 5'-inosinic acid.

3. The feed composition of claim 1, comprising 0.1-20 wt. % of an extract from yeast containing 0.5-10 wt. % of each of 5'-guanylic acid, 5'-cytidylic acid, 5'-uridylic acid, and 5'-adenylic acid or 5'-inosinic acid.

4. The feed composition of claim 1, comprising 0.1-20 wt. % of an extract from yeast containing 0.5-10 wt. % of each of 5'-guanylic acid, 5'-cytidylic acid, 5'-uridylic acid, and 5'-adenylic or 5'-inosinic acid and from 10-45 wt. % of an oligopeptide.

5. A method for improving the feeding preference of fish for a feed composition, comprising feeding fish a feed composition comprising an amount of 5'-guanylic acid, 5'-cytidylic acid, 5'uridylic acid, and 5'-adenylic acid or 5'-inosinic acid effective to synergistically improve the feeding preference of the fish for said feed composition, wherein said feed composition comprises
    (a) 0.03-1 wt. % of each of 5'-guanylic acid, 5'-cytidylic acid, 5'-uridylic acid, and 5'-adenylic acid or 5'-inosinic acid,
    (b) 0.1-20 wt. % of an extract from yeast containing 0.5-10 wt. % of each of 5'-guanylic acid, 5'-cytidylic acid, 5'-uridylic acid, and 5'-adenylic acid or 5'-inosinic acid, or
    (c) 0.1-20 wt. % of an extract from yeast containing 0.5-10 wt. % of each of 5'-guanylic acid, 5'-cytidylic acid, 5'-uridylic acid, and 5'-adenylic acid or 5'-inosinic acid and 10-45 wt. % of an oligopeptide.

6. The method of claim 5, wherein said feed composition comprises 0.03-1 wt. % of each of 5'-guanylic acid, 5'-cytidylic acid, 5'-uridylic acid, and 5'-adenylic acid or 5'-inosinic acid.

7. The method of claim 5, wherein said feed composition comprises 0.1-20 wt. % of an extract from yeast containing 0.5-10 wt. % of each of 5'-guanylic acid, 5'-cytidylic acid, 5'-uridylic acid, and 5'-adenylic acid or 5'-inosinic acid.

8. The method of claim 5, wherein said feed composition comprises 0.1-20 wt. % of an extract from yeast containing 0.5-10 wt. % of each of 5'-guanylic acid, 5'-cytidylic acid, 5'-uridylic acid, and 5'-adenylic or 5'-inosinic acid and from 10-45 wt. % of an oligopeptide.

* * * * *